9744X
CLARK & BOYNTON.
Machine for Planing Stone.
Patented June 20, 1836.
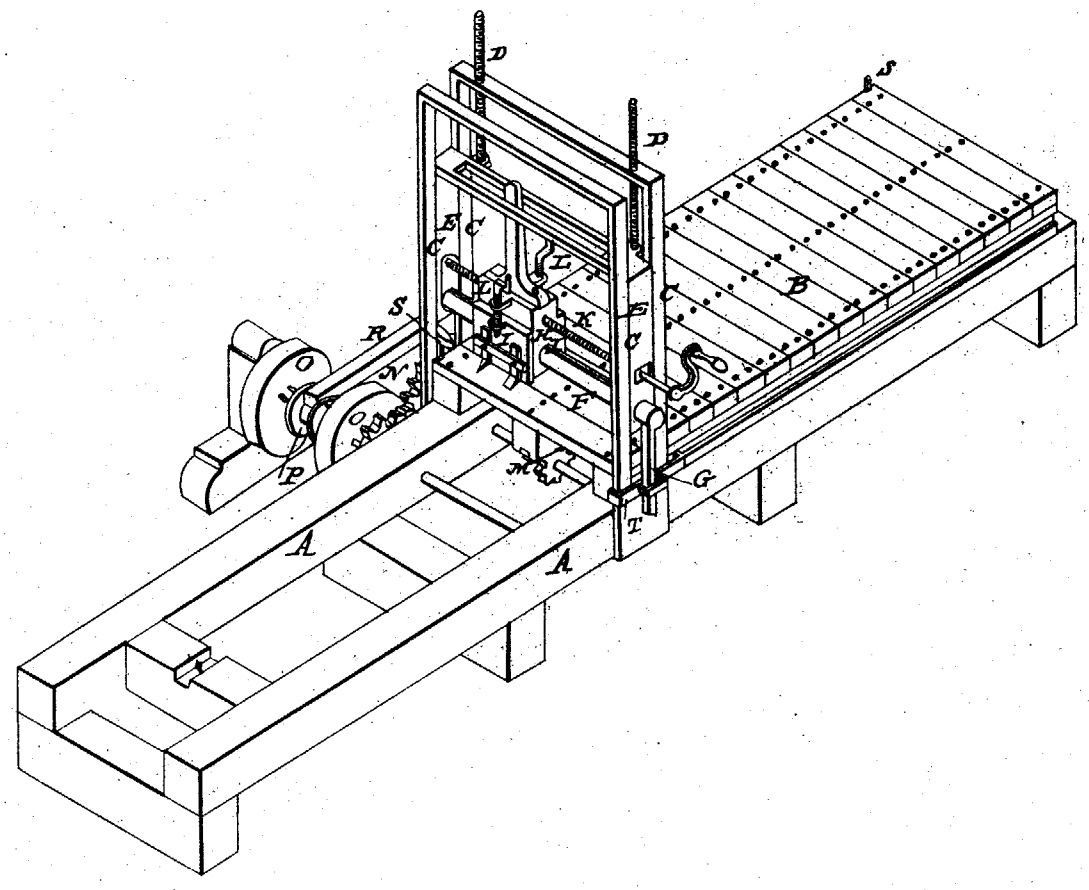

9744X June 20, 1836 11

Anson Clark & Charles B Boynton West Rock Bridge Mass.

Letters Patent

The Schedule referred to in these Letters Patent and making part of the same containing a descrip-
tion in the words of the said Anson Clark and Charles B Boynton themselves of their im-
provement in the machine for planing or cutting and sawing Stone.

To all to whom these presents shall come. Be it known that We Anson Clark
and Charles B Boynton both of West Rockbridge in the County of Berkshire and State
of Massachusetts have invented certain new and useful improvement in the cutting
or planing and sawing of Marble & other Stone
Upon a suitable foundation are placed two sticks of timber about twelve inches square
and at least twice as long as the longest block of stone which is intended to be cut
or planed. These timbers are designed to support the other part of the machine &
are framed together about five feet apart. A Platform to hold the blocks which
are to be planed is formed by bolting plank two or more inches thick upon longi-
tudinal timbers about eight inches square. This platform for common purpose
should be about five feet in width and about twelve feet long. It is placed
upon the foundation timbers and may slide thereon either upon ways or slides
or upon friction Rollers. In the centre of the foundation timbers are placed four
upright cast iron posts, about seven feet in height [illegible] and of any required
strength. These posts serve for guides in which the frame that holds the tools is
moved up and down by screws according as the blocks to be planed vary in thickness
the tool frame is an oblong cast iron frame fitted to move accurately in the guides
of the upright posts and is raised or lowered by means of screws passing through
the cross Bar that connects the tops of the upright posts. In the lower part of this
tool frame is hung a horizontal cylinder of cast iron about five inches in diameter.
This cylinder or shaft rests on the tool frame upon a journal turned on each end
so as to permit a motion on its axis and one end of the shaft or cylinder passes
through the tool frame far enough to allow the attachment of a lever upon the
outside of the upright posts. This cylinder is accurately turned through its whole
length so that the cast iron block to which the tools are secured may slide
upon it from one side of the platform to the other upon the upper side of the
cylinder is cut a groove of about half an inch in depth through its whole [illegible]

and to this groove is fitted a tongue in the tool block that prevents it from turning
round upon the cylinder. The tool block is of cast iron about eight inches square and
cored out so as to be nicely fitted to the horizontal cylinder and a strong screw passes
from one side of the tool frame to the other and through the tool block above the
cylinder by which screw the tool block is moved upon the cylinder from one side
of the platform to the other. Two sliding cast iron plates of about one inch in thick-
ness. and of the same width of the tool block are fitted to the tool block one upo[illegible]
each side. To these plates the tools are secured by screws & the plates are moved
upon and down on the tool block by screws. so that the tools may be accurately
adjusted to the surface of the stone or to the depth required to be cut. There are
projections both on the tool block. & on the sliding plates through which the
screws pass. A strong bar of iron either cast with or bolted to the top of the too[l]
block runs upward about twelve inches. and between the cross bars that form the
upper part of the tool frame. The use of this bar is to steady the tool block by rest-
ing alternately upon each cross bar of the tool frame as one or the other set
of tools is brought into operation. The screw which runs through the tool block
horizontally for the purpose of sliding it back and forth along the cylinder has
a crank upon one end and it may be moved either by hand or by machinery.
Upon the under side of the centre longitudinal timber of the platform toothed
rack into which works a pinion hereafter described. by which rack &
pinion the platform is carried backward and forward beneath the tools.
The pinion which works into the rack is fixed upon a horizontal shaft lying
beneath the platform and across the foundation timbers. upon one end of this sha[ft]
is placed a cog wheel which is moved by another cog wheel upon a second shaft
lying like the first across the foundation timbers and parallel to the first named
shaft. upon this second shaft are two pulleys with a clutch between them. One of
these pulleys is worked by an open and the other by a cross band so that they
revolve in opposite directions. and by the shifting of the clutch a reciprocating
motion is communicated to the platform. The clutch is shifted from one pull[ey]
to the other by means of a lever moving horizontally upon a joint or pin. One
end of this lever lies in the clutch. the other is bent like an elbow is so p[illegible]
as to be struck by pins projecting from the edge of the platform. upon one [illegible]
of the horizontal cylinder is attached a lever on the outside of the tool fram[e]

9744x

June 20, 1836 and upright posts. This lever hangs in a perpendicular position and is used to shift
the position of the tool block by rolling the cylinder so that the tools being placed
upon opposite sides of the tool block may be brought alternately into operation as
the platform moves back and forth & likewise to prevent the tools upon one side
from dragging upon the stone while those upon the other side are cutting. The
lower end of this lever is attached to a clasp upon one of the upright posts opposite
the edge of the platform. This clasp is several inches longer than the width of the
post, so that it can slide a short distance back and forth. Upon the inner
side of this clasp is fastened a forked spring which runs in a groove in the edge
of the platform. The compression of the spring within the groove causes suf-
ficient friction not only to move the lever as far as the clasp will permit but
also to hold it steadily in its place. The manner in which this part of
the machine operates is as follows. The block or blocks to be planed having
been placed upon the platform, one point for roughing off & one chisel for
smoothing are placed upon each side of the tool block, or if the block is only
to be rough hewn four points may be used. The tools having been properly adjus-
ted, the machine is set in motion and the block with the platform passes on
beneath the tools until a pin in the edge of the platform strikes the lever that ship[s]
the clutch & the motion is reversed. The friction upon the [illegible] spring which runs
in the groove in the edge of the platform carries back the clasp with the lev-
er attached and the cylinder is thus rolled so as to change the position of the
tool block and bring the second set of tools into operation. At the same
time the screw which moves the tool block along the cylinder is to be turned
so as to slide the tools as much farther upon the stone as is desirable to cut.
The platform now passes on until the pin upon the other end of the platform
strikes the lever which which shifts the clutch and again reverses the
motion. That part of the machine designed for sawing is constructed as fol-
lows. Four upright posts of wood or iron are framed or bolted to foundation
timbers so as to form a frame about four feet high and about eight feet wide.
A cast iron frame is fitted to slide up and down within the first mention-
ed frame by means of a screw passing through one of the cross pieces at the
top of the outside frame. Near the ends of this cast iron frame are placed
two horizontal iron pulleys. around these pulleys runs an endless saw.

9744x June 20, 1836 made of band or hoop iron: upon the upper end of the shaft which passes through one of the pulleys
is placed a horizontal cog wheel which works into a vertical[?] wheel, upon the shaft of the vertical
wheel is a pulley around which a belt passes which puts the machine in operation. This belt also
passes around a pulley upon the main shaft of the planing machine. The stone is to be placed
between the horizontal pulleys beneath the saw. The pressure of the saw upon the stone is regu-
lated by the screw which raises and lowers the frame: and the saw is supplied with sand and
water as are the saws now in use for the sawing of stone. What is claimed as new in the planing
machine is the form of the tool blocks. except the sliding plates: the manner in which it is held
firm & secure by the bar which rests against the cross bar of the tool frame; the method by
which the position of the tool block is altered so as to bring one set of tools into operation and prevent
the other from dragging upon the surface of the stone. and the application of the combined ma-
chinery to the planing cutting or working of stone. What I claimed as new in that part of the -
machine for [illegible] sawing is the application of an iron belt saw to the sawing of stone to be used with
sand and water as other saws now are. by which application the advantages of a circular m[illegible]
are obtained without the inconvenience of the common circular saw. The planing machine
is applicable not only to the squaring of blocks & the leveling and smoothing of surfaces but to the
rounding and fluting of columns. the cutting of grooves and straight mouldings for steps, cornices
and other similar work. The principal feature of this machine that distinguishes it from
Hunter's English stone planing machine is that in the English machine. the tool moves over
a stationary stone. while in this the stone moves upon a platform against stationary tools
Hunter's tool frame moves cross wise of his platform so that no blocks can with his machine [illegible] be
planed lengthwise longer than the width of the platform. Many blocks of our marble for build-
ing are from nine feet to twelve feet long and from twelve inches to fifteen inches square.
These cannot be planed crosswise because the tools would destroy the corners of the blocks wh.
it is absolutely necessary to preserve. To plane such blocks in a machine of Hunter's form
would require a machine so large as to be cumbersome and unwieldy. Hunter's tools can on[ly]
be raised or lowered a few inches. Our marble blocks vary in thickness from a few inches to
several feet. and our tool frame rises and falls three or more feet in order to adapt itself to the
different thicknesses.

Exd. Witnesses
[illegible] Robbins Kellogg
Luke [illegible]

Anson Clark
Charles B Boynton (Patented 20 June 1836) (2016 [illegible]